United States Patent [19]

Nathan et al.

[11] 4,291,314

[45] Sep. 22, 1981

[54] TRANSVERSE MAGNETIC PRINTING HEAD

[75] Inventors: Bernard D. Nathan, Lynchburg, Va.; Donald R. Witter, Ballston Lake, N.Y.

[73] Assignee: General Electric Company, Schenectady, N.Y.

[21] Appl. No.: 40,586

[22] Filed: May 21, 1979

[51] Int. Cl.³ .......................................... G01D 15/06
[52] U.S. Cl. ................................ 346/74.5; 360/119; 360/120
[58] Field of Search ............. 346/74.1; 360/125, 126, 360/127, 119–124; 29/603

[56] References Cited

U.S. PATENT DOCUMENTS

| | | | |
|---|---|---|---|
| 4,019,206 | 4/1977 | Haas | 346/74.1 X |
| 4,044,394 | 8/1977 | Hanazono et al. | 360/121 X |
| 4,097,871 | 6/1978 | Berkowitz et al. | 360/124 X |
| 4,163,995 | 8/1979 | Nayland | 360/123 X |
| 4,170,033 | 10/1979 | Ridgway et al. | 360/125 X |
| 4,176,362 | 11/1979 | Nelson | 346/74.1 |

*Primary Examiner*—John H. Wolff
*Attorney, Agent, or Firm*—Alexander M. Gerasimow; James C. Davis; Marvin Snyder

[57] ABSTRACT

A high resolution magnetic printing head possesses a comb-like magnetically permeable member formed by electrodeposition. A magnetic printing head comprising a substrate with an elongated gap across which conductive lines pass is formed by electrodeposition of magnetically permeable material between adjacent wires on a substrate. A special jig facilitates electrodeposition with a constant flow of electrolyte through the gap and between the wires during the plating process. A single such substrate with its associated gap and conductive wires is employed in certain applications, however, a dual or triple substrate configuration with each substrate and its associated set of wires being aligned with each other substrate and set of wires is preferred for use in a coincident current printing head.

8 Claims, 4 Drawing Figures

TRANSVERSE MAGNETIC PRINTING HEAD

BACKGROUND OF THE INVENTION

This invention relates to magnetic printing heads, and in particular to a method of manufacturing high resolution transverse magnetic printing heads using electrodeposition.

Magnetic printing is a rapid and quiet system for producing images of both alpha-numeric and pictorial data. Magnetic printing basically involves the transfer of a dry magnetic ink from a ferromagnetic recording medium to a permanent paper medium. The magnetic ink is selectively attractive to portions of the recording medium by magnetizing portions of the magnetic recording medium through the use of a recording head which typically possesses a comb-like magnetically permeable structure. The teeth of the comb-like structure define gap regions between the teeth to facilitate the concentration of magnetic flux at the tips of the teeth. In a transverse printing head, these teeth tips are positioned in close proximity to the magnetic recording medium which is conventionally moved past the recording head so that the direction of motion of the recording medium is perpendicular to the direction of the magnetic flux lines between the tips of the teeth of the comb-like structure. Typically, a plurality of current carrying conductors pass through each of the gaps in the comb-like structure formed by its teeth and the current in these conductors controls the level of magnetic flux at the tips of the teeth of the comb. When sufficient current is passed through these conductors, the increased flux is sufficient to magnetize a selected portion of the recording medium which thereafter attracts magnetic ink to itself as the medium passes a magnetic brush assembly containing the magnetic ink. In this manner, the latent magnetic image impressed on the recording medium by the recording head is made visible. The recording medium with its magnetic ink images is then typically passed between heated rollers between which also passes a paper medium which receives the magnetic ink from the recording medium. The pattern on the magnetic recording medium is subsequently magnetically erased prior to the recording of new information thereon. A detailed description of magnetic printing and magnetic printing heads is found in U.S. Pat. No. 4,097,871, issued June 27, 1978 to Berkowitz et al. and assigned to the same assignee as the present invention, said patent being incorporated herein by reference.

The quality of an image that results is directly related to the resolution which is, in turn, directly related to the spacing between adjacent teeth of the magnetic comb-like structure. At a resolution of approximately 120 gaps or dots per inch, the spacing between adjacent comb teeth and adjacent conductive wires passing between the teeth is only approximately 5 mils. This is extremely tight spacing and it is often difficult to insert the comb into the substrate without bending wires or breaking teeth on the comb because of the delicate sizes involved. Moreover, if even higher resolutions, such as 200 dots per inch are desired, it does not appear to be possible to employ such a separate comb-like structure.

SUMMARY OF THE INVENTION

In accordance with a preferred embodiment of the present invention, a set of three insulating substrates each contains an elongated gap and each has conductive wires disposed thereon crossing the gap. There are an equal plurality of conducting lines crossing the gap on each substrate, lines on each substrate being substantially parallel to lines on the other substrates as the lines cross the gap. Each conductive line is opposite a corresponding line on the other substrate. The elongated gaps on the substrates are aligned and the configuration thus described defines regions between opposed conductive lines and also nearby regions between adjacent conductive lines. The regions between adjacent conductive lines have disposed therein a magnetically permeable material which has been electrodeposited therebetween. The regions between opposed conductive lines preferably have disposed therein an electrically insulating material such as epoxy. The electrodeposition of the magnetically permeable material obviates the necessity for providing a separate mechanical magnetic comb structure and permits adjacent pairs of conductors to be spaced closer together thereby increasing the resolution and print quality produced by the magnetic printing head.

In accordance with another embodiment of the present invention, a transverse magnetic printing head comprises only a single substrate with an associated elongated gap and conducting lines crossing said gap as in the above-mentioned embodiment. Such a configuration is useful in those circumstances in which each conductive line is separately driven or in those circumstances in which a matrix drive is provided but in which the selection of individual lines to be driven is accomplished by circuitry not present on the substrate comprising the printing head.

There is also disclosed herein a method and an apparatus for performing the necessary electrodeposition. A significant feature of the electrodeposition method of the present invention is that a continuous flow of electrolyte is maintained during the electrodeposition process. This electrolyte flow is maintained through the elongated gap or gaps depending upon the embodiment desired, through a jig which acts to direct the electrolyte flow past the cathode plating wire and through the elongated gaps in the substrates and through the pattern of conductive windings as they cross the elongated gap or gaps.

Accordingly, it is an object of the present invention to provide a high resolution transverse magnetic printing head having a magnetically permeable member formed by electrodeposition.

DETAILED DESCRIPTION OF THE INVENTION

Figure 3:
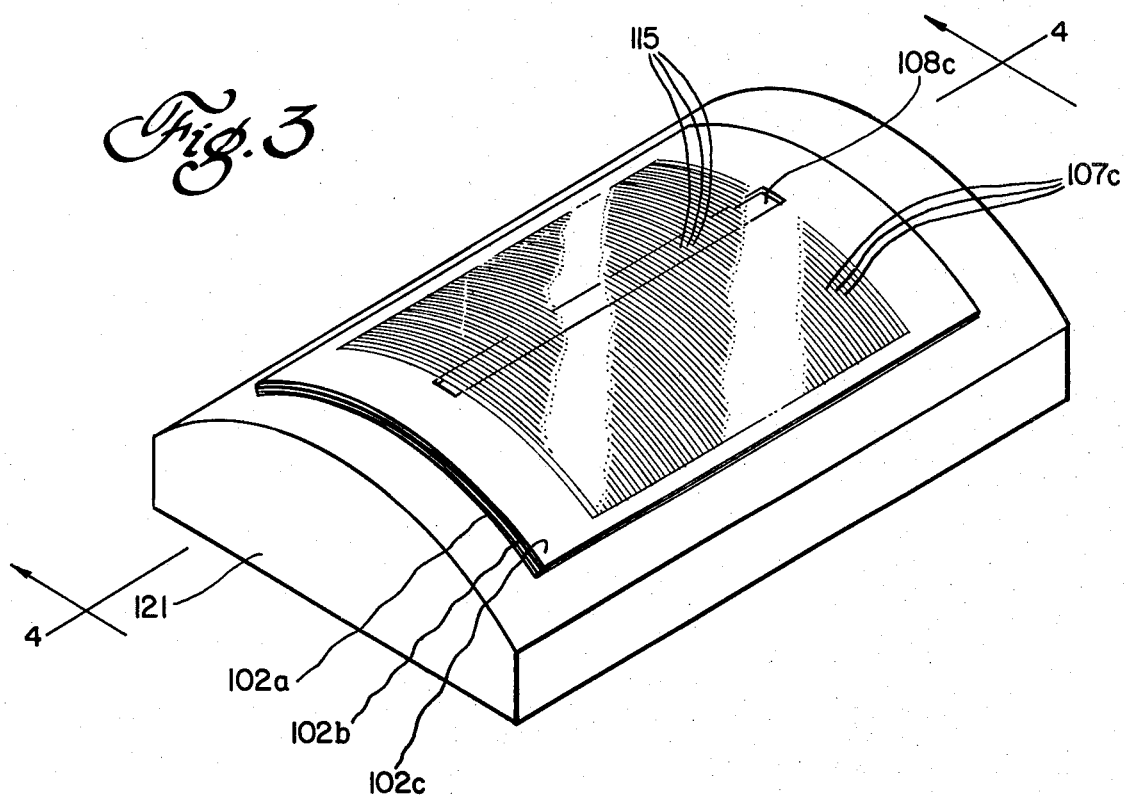
FIG. 3 is a perspective view illustrating an assembled transverse magnetic printing head comprising three substrates and produced in the apparatus of FIG. 1.
Figure 4:
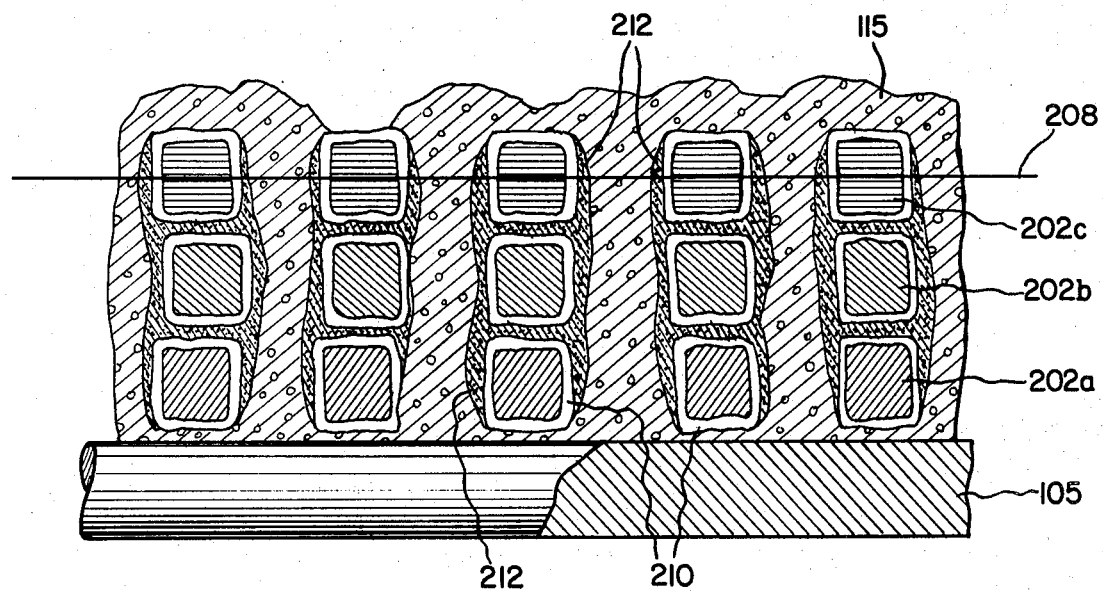
FIG. 4 is a cross-sectional view taken along line 4—4 in FIG. 3 of the conductive wires as they cross gaps in the substrates after electrodeposition of magnetically permeable material.

For a better understanding of the method of producing a transverse magnetic printing head in accordance with the present invention, the actual configuration of the resulting head is first described. In particular, the embodiment employing three substrates for coincident current operation is now discussed. FIG. 3 illustrates first or upper substrate 102c having disposed therein an elongated gap 108c. The substrates 102 may comprise many conventional insulating materials such as MYLAR ® or insulated aluminum. Conductive current carrying lines 107c are disposed on substrate 102c typically by conventional photoresist and etching methods. The lines are nonintersecting, and particularly in the region of the gap 108c, the lines 107c are insulated with materials such as PARYLENE ® or TEFLON ®. Since the particular printing head illustrated in FIG. 3 describes a coincident current, matrix driven printing head, there is also disposed beneath substrate 102c similar substrates 102b and 102a, each also possessing elongated gaps 108b and 108a, respectively, (not visible) and conducting lines 107b and 107a, respectively, (also not visible). The elongated gaps are substantially aligned with one another on substrates having substantially the same dimensions. All conducting lines are substantially parallel to one another and aligned as they cross the elongated gap portions of the substrates. Preferably, there are the same number of conducting lines is disposed substantially opposite a conducting line on the other substrates. Thus, there is defined a triple set of parallel conducting lines crossing gaps in opposed substrates. The upper substrate 102c and its associated conductive lines 107c are at least partially sacrificial and do not operate as active circuits. This upper substrate is typically partially destroyed during a grinding step to produce a smooth head as shown in FIG. 4. The substrates may be conveniently mounted on arched supporting member 121 which may comprise, for example, material such as anodized aluminum, for the purpose of positioning the elongated gap portion of the printing head in closer proximity to a recording medium moving past the head. The pattern of conductive lines defines regions between opposed conductors (different substrates) and regions between adjacent conducting lines (same substrates). This is most easily seen in FIG. 4. Most significantly in FIG. 3, there is shown magnetically permeable material 115 which has been electrodeposited between adjacent lines but preferably said magnetically permeable material is not disposed between opposed wires. In this fashion, a comb-like structure similar to that described in the abovementioned patent of Berkowitz et al. is produced in situ. Moreover, this comb-like structure is produced by electrochemical means and is not assembled by manual methods which exhibit significantly decreasing effectiveness with decreasing spacing between the conductive lines and concomitant increase in resolution.

FIG. 4 illustrates a sectional view taken along line 4—4 in FIG. 3 of a portion of the conductive lines as they cross the gap in the substrates. The sectional cut is perpendicular to the wires as they cross the gaps. In FIG. 4 there is shown the cathode wire 105 above which is a layer of conductive word lines 202a and above them a layer of conductive digit lines 202b and above them a layer of inactive, sacrificial lines 202c. Each line is surrounded by a conductive coating of insulating material 210 such as PARYLENE. Also, encapsulating each set of vertical lines is a layer of nonmagnetic insulating material 212 typically comprising epoxy. Thus, this epoxy insulation appears between conductive lines on different substrates. Most importantly, there is, disposed between each triple of conductive leads, magnetic permeable material 115 formed by electrodeposition and typically comprising an amorphous cobalt-phosphorous plating. Thus, the magnetically permeable material 115 is disposed in those regions between adjacent conductive lines and the epoxy insulation 212 is disposed in the region between opposed conductive lines. As indicated above, the upper layer 202c is sacrificial and during a polishing step the material above the line 208 as shown is removed.

Figure 1:
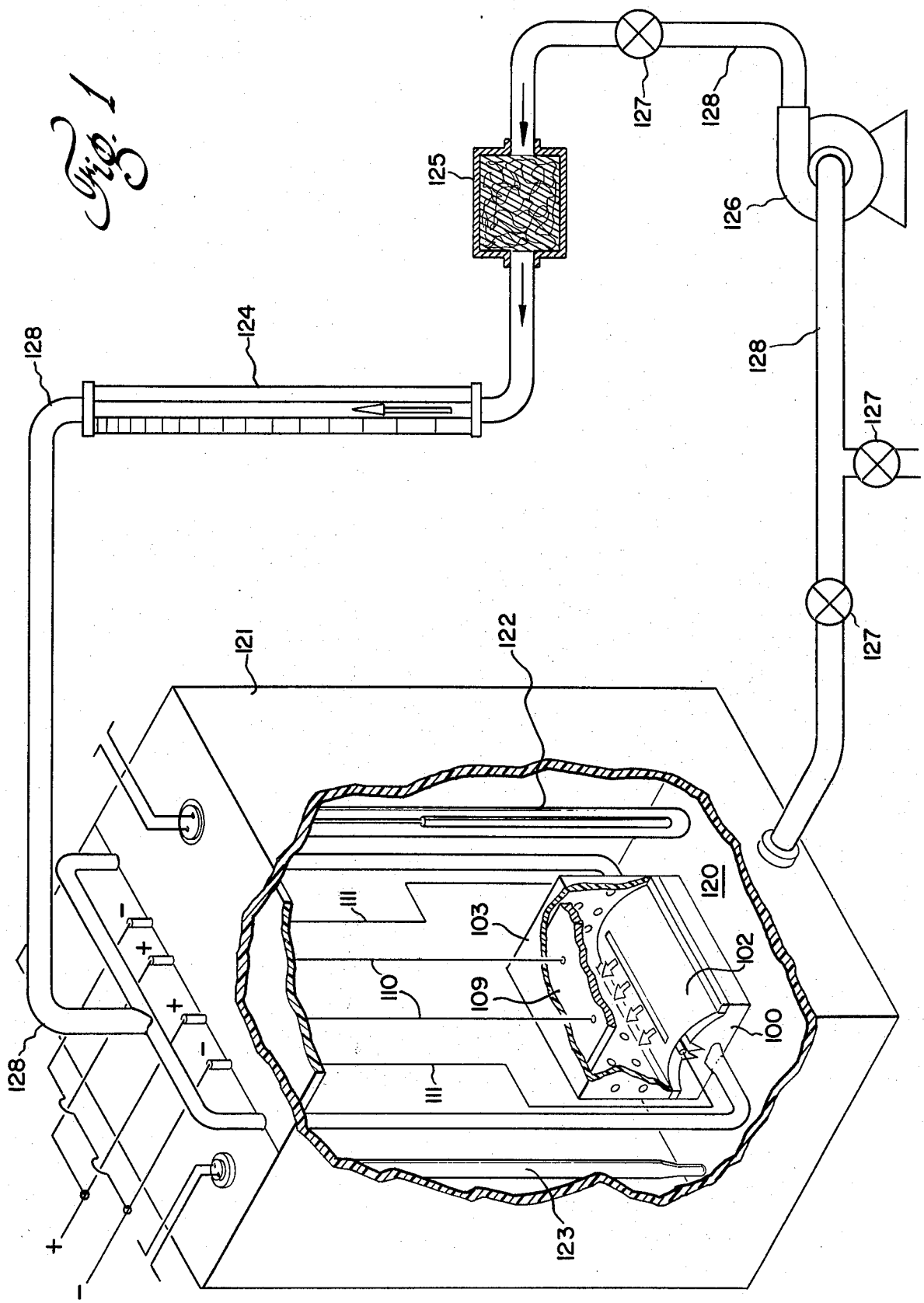
FIG. 1 is a partial sectional perspective view illustrating the apparatus for electrodeposition.

The electrodeposition of magnetically permeable material may be conveniently carried out in an apparatus such as that described in FIG. 1 wherein substrate or substrates 102 are mounted on a jig 100 which directs the flow of electrolyte 120 through the elongated gaps in the substrate or substrates and between conductive lines bridging the gap or gaps. The jig 100 preferably comprises TEFLON or DELRIN ® but may comprise any inert, rigid, machinable material. The electrolyte 120 is circulated by means of pump 126 through glass or plastic conduit 118. Filter 125 may also be conveniently provided in the flow path for the removal of particulate matter. The pump 126 is preferably controllable so as to maintain a constant rate of electrolyte flow, as measured by flowmeter 124. Valves 127 are provided for convenience for initially filling the electrodeposition apparatus and/or for regulating the rate of electrolyte flow. The jig 100 for directing the electrolyte flow and for holding the substrate or substrates is immersed in the electrolyte 120 which is contained in outer vessel 121 which has openings therein for the electrolyte conduits and for the electrodes required for electrodeposition. Also disposed through vessel 121 are a heating element 122 for fine control of the temperature of the electrolyte and electronic thermometer 123 for measuring the electrolyte temperature. Primary heating of the vessel and electrolyte is accomplished by a conventional electric or gas heater below the vessel (not shown here). The top of the jig 100 is capped with a cage 103 further serving to control the direction of electrolyte flow toward an anode connected externally by means of leads 110 to the positive terminal of a voltage source. A cathode wire is disposed in the flow path immediately beneath the elongated gap in the substrate or substrates and is externally connected to the negative terminal of a voltage source by means of leads 111.

Figure 2:
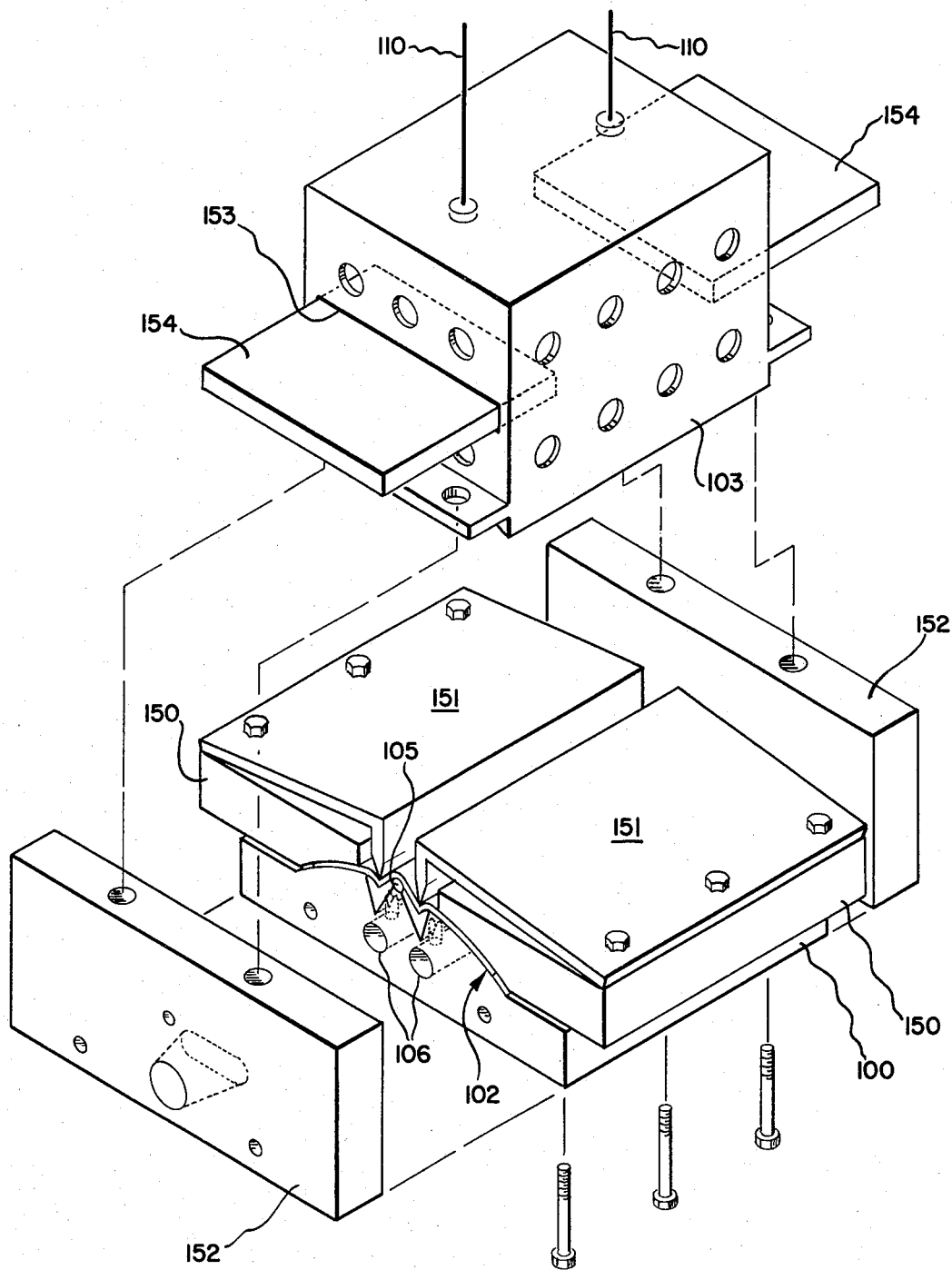
FIG. 2 is a perspective exploded view of a portion of FIG. 1 illustrating details of the substrate and electrodeposition jig.

FIG. 2 is a detailed exploded view of a portion of FIG. 3 more particularly describing the jig, substrate, and cage assembly. In particular, there is shown channels 106 through jig 100 for the even flow of electrolyte through the substrate or substrates 102. The substrates are clamped into the jig by means of hold-down members 150 each having a resilient arm clamp 151 mounted thereon to firmly hold the conductive lines against cathode wire 105. The flow of electrolyte is upward through the substrate. To facilitate the flow of electrolyte, jig 100 has a pair of V-shaped notches along the top arched portion running substantially parallel to the elongated gap in the substrate. Disposed along the top portion of the pair of notches is cathode wire 105 which preferably comprises nickel iron wire. The cathode wire is also disposed immediately beneath the elongated gap portion of the substrate. While FIG. 2 shows only a single substrate structure mounted in the jig, two or three substrates may be just as easily mounted and positioned as shown in FIG. 3. Each substrate 102 possesses an elongated gap portion 108 across which conductive leads 107 pass. Further details with respect to the method employed in the case of multiple substrates is provided below. Nonetheless, in the case of either single or multiple substrates, cage 103 preferably comprising an inert material, such as TEFLON or DELRIN, is disposed over the substrate as shown to further direct the flow of electrolyte toward the anode 109 which preferably comprises platinum or cobalt. The cage member 103 is conveniently bolted to side member 152 which in turn is bolted to the side of the jig 100 as shown in FIG. 2. A side member 152 is provided at each end of the jig. The cage 103 also preferably possesses slots 153 through which baffles 154 may be positioned, if desired. Because there is a certain tendency for thicker electrode deposition at the ends of the cathode wire, the baffles may be provided to reduce the electric field at the ends of the wire by increasing a path between the anode and the cathode. However, for a longer magnetic printing head than that illustrated in the figures herein, it is more preferable to provide a series of anodes, each with its own controllable electrolytic current. The electrolyte itself comprises a mixture of water, orthophosphorous acid ($H_3PO_3$), orthophosphoric acid ($H_3PO_4$), cobalt carbonate ($CoCO_3$), and hydrated cobalt chloride ($CoCl_2.6H_2O$). In particular, a desirable portion of these ingredients per liter of water is: 50 g per liter of orthorphosphorous acid, 50 g per liter of orthophosphoric acid, 33.7 g per liter of cobalt carbonate, and 185 g per liter of hydrated cobalt chloride. This solution is described in *Amorphous Magnetism* by G. S. Cargill, III and R. W. Cochrane, Plenum Press, New York, 1973, Ed. by H. O. Hooper and A. M. de Graaf. The electrolyte flow rate is preferably maintained at approximately 900 ml per minute; the preferable temperature for the electrolyte is approximately 80° C.; and the preferable level of electrical current maintained between the cathode and the anode is approximately 120 milliamps. The resultant electrodeposited amorphous cobalt-phosphorous alloy has particularly good magnetic properties for the present application which are even further enhanced by post deposition heat treatment.

While the apparatus illustrated in FIGS. 1 and 2 is employable in the production of magnetic printing heads based on either a single or multiple substrates, additional steps should be taken in the case of multiple substrates to prevent the electrodeposition of magnetically permeable material between opposed conducting lines as they cross their respective gaps. However, the electrodeposition of magnetically permeable material between adjacent pairs of conducting lines is to be encouraged. To facilitate this desired electrodeposition pattern, the substrates in a multiple substrate printing head are adhesively joined preferably with a substance such as epoxy having a relatively slow curing time, such as approximately 3 minutes. The epoxy is disposed between the substrates and fills all the regions both between adjacent and opposed conductive leads. The epoxy is then blown out by means of a pressurized stream of gas, such as air, from between the adjacent pairs of conductive windings. The epoxy or other suitable adhesive is then permitted to harden and both substrates mounted in the jig of FIG. 1. In this manner, the regions between opposed pairs of conductive leads are filled with hardened epoxy or other adhesive which effectively prevents electrodeposition of magnetically permeable material between opposed pairs of conductive windings while permitting electrodeposition between adjacent pairs of conductive windings.

Following the electrodeposition process, any excess magnetic material may be removed by grinding or polishing and in fact it is preferable in any event to use a sacrificial substrate layer as shown in FIG. 4. The finished substrate is then preferably mounted on a supporting member such as an arched anodized aluminum surface to place the teeth of the resulting electrodeposited magnetic comb in close proximity to a recording surface for receiving latent magnetic images. Additionally, the recording head may be further coated with epoxy or other substance to afford it a greater protection from abrasion or other environmental influences.

In the case that a multiple substrate magnetic printing head is produced, one active set of conducting lines on one substrate is commonly referred to as the "word lines" and the corresponding lines on another active substrate as the "digit lines". In either case, these lines are preferably insulated particularly in the vicinity where they cross the gap. For this application, materials such as TEFLON or PARYLENE are suitable insulating materials. And while the substrates may comprise any convenient insulating material, they preferably comprise flexible printed circuit material such as MYLAR. Moreover, the word and digit lines may be provided on opposite sides of a single substrate.

From the above, it may be appreciated that the methods and apparatus of the present invention produce a transverse magnetic printing head for impressing latent magnetic images on a magnetizable medium moving relative to the head which exhibits a high degree of resolution without the concomitant problems of inserting a delicate magnetically permeable comb assembly into a substrate having closely spaced conductive leads. The electrodeposition technique of the present invention provides a quick inexpensive, high yield process for producing high resolution printing heads. While the illustrations herein show the production of an approximately two inch long magnetic head portion for illustrative purposes, any convenient length of magnetic printing head is easily producible by the methods and apparatus herein.

While this invention has been described with reference to particular embodiments and examples, other modifications and variations will occur to those skilled in the art in view of the above teachings. Accordingly, it should be understood that within the scope of the appended claims the invention may be practiced otherwise than is specifically described.

The invention claimed is:

1. A transverse magnetic printing head for impressing latent magnetic images on a magnetizable medium moving relative to said head, said head comprising:
   a plurality of nonintersecting, conductive word lines disposed on a first, insulating substrate, said word lines crossing a first elongated gap in said first substrate, said word lines being insulated along those portions crossing said gap;
   a plurality of nonintersecting, conductive digit lines disposed on a second, insulating substrate, said digit lines crossing a second elongated gap in said second substrate, said digit lines being insulated along those portions crossing said gap, said first and second elongated gaps being adjacently aligned and having substantially the same dimensions, each of said digit lines being substantially parallel to and opposite a word line where said lines cross said gaps;

a plurality of nonintersecting, sacrificial conductive lines disposed on a third, insulating substrate, said sacrificial lines crossing a third elongated gap in said third substrate, said second and third elongated gaps being adjacently aligned and having substantially the same dimensions, each of said sacrificial lines being substantially parallel to and opposite a digit line where said lines cross said gaps; and magnetically permeable material electrodeposited between adjacent word, digit, and sacrificial lines so as to form magnetic pole pieces along said elongated gap, so that adjacent magnetic pole pieces may be selectively energized by coincident current electrical signals present on said digit and word lines.

2. The magnetic printing head of claim 1 in which said word and digit lines are disposed on opposite sides of a single substrate.

3. The magnetic printing head of claim 1 further comprising means for supporting said substrates so as to position said magnetically permeable material in close proximity to the magnetizable medium.

4. The magnetic printing head of claim 3 in which said supporting means comprises an arched, anodized aluminum support member and in which said substrates are sufficiently flexible so as to conform to said arched support member.

5. A transverse magnetic printing head for impressing latent magnetic images on a magnetizable medium moving relative to said head, said head comprising:

a plurality of nonintersecting conductive lines disposed on an insulating substrate containing therein an elongated gap across which each of said lines pass, said lines being insulated along those line portions crossing said gap; and magnetically permeable material electrodeposited between said lines where said lines cross said gap.

6. The magnetic printing head of claim 1 further comprising means for supporting said substrate so as to position said magnetically permeable material in close proximity to the magnetizable medium.

7. The magnetic printing head of claim 6 in which said supporting means comprises an arched anodized aluminum support member and in which said substrate is sufficiently flexible so as to conform to said arched support member.

8. A transverse magnetic recording head for impressing latent magnetic images on a magnetizable medium moving relative to said head, said head comprising:

a plurality of nonintersecting, conductive word lines disposed on a first, insulating substrate, said word lines crossing a first elongated gap in said first substrate, said word lines being insulated along those portions crossing said gap;

a plurality of nonintersecting, conductive digit lines disposed on a second, insulating substrate, said digit lines crossing a second elongated gap in said second substrate, said digit lines being insulated along those portions crossing said gap, said first and second elongated gaps being adjacently aligned and having substantially the same dimensions, each of said digit lines being substantially parallel to and opposite word line where said lines cross said gaps; and magnetically permeable material electrodeposited between adjacent word and digit lines so as to form magnetic pole pieces along said elongated gap.

* * * * *

UNITED STATES PATENT AND TRADEMARK OFFICE
CERTIFICATE OF CORRECTION

PATENT NO. : 4,291,314
DATED : September 22, 1981
INVENTOR(S) : Bernard D. Nathan and Donald R. Witter It is certified that error appears in the above—identified patent and that said Letters Patent is hereby corrected as shown below:

Column 3, line 25, after "lines" insert

-- crossing the elongated gap on each substrate and each conducting line --

Column 8, line 5, delete "1" and substitute therefor

-- 5 --

Signed and Sealed this

Second Day of November 1982

[SEAL]

Attest:

Attesting Officer

GERALD J. MOSSINGHOFF

Commissioner of Patents and Trademarks